Aug. 16, 1960  T. T. BROWN  2,949,550
ELECTROKINETIC APPARATUS

Filed July 3, 1957  2 Sheets-Sheet 1

INVENTOR
THOMAS TOWNSEND BROWN
BY
Watson, Cole, Grindle & Watson
ATTORNEYS

Aug. 16, 1960   T. T. BROWN   2,949,550
ELECTROKINETIC APPARATUS
Filed July 3, 1957   2 Sheets-Sheet 2
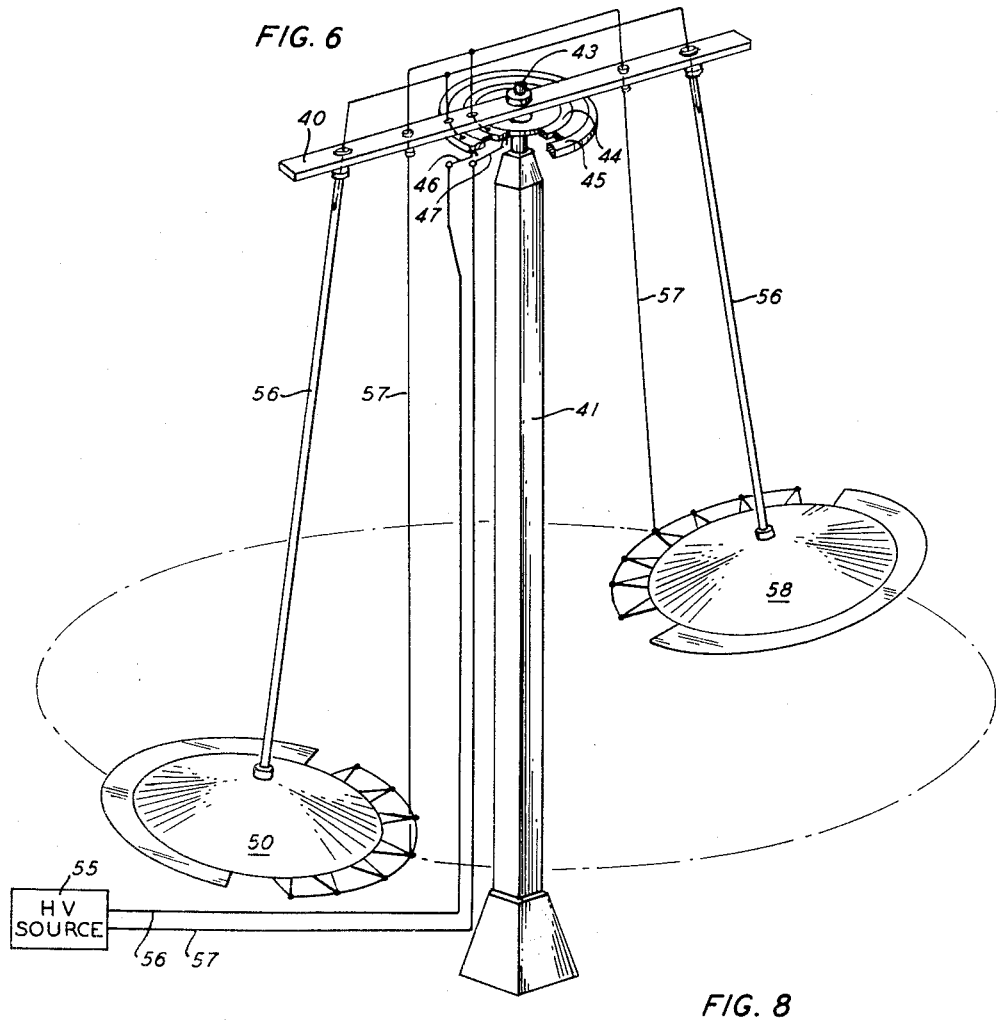
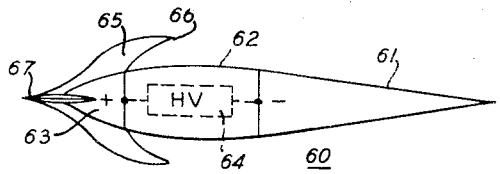
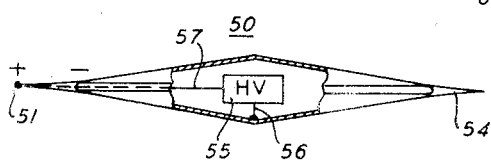
INVENTOR
THOMAS TOWNSEND BROWN
BY
Watson, Cole, Grindle & Watson
ATTORNEYS

2,949,550
ELECTROKINETIC APPARATUS

Thomas Townsend Brown, Umatilla, Fla., assignor to Whitehall-Rand, Inc., Washington, D.C., a corporation of Delaware Filed July 3, 1957, Ser. No. 669,830

12 Claims. (Cl. 310—5)

My invention relates to electrokinetic apparatus, and more particularly to a method and apparatus for utilizing electrical potentials for the production of forces for the purpose of causing relative motion between a structure and the surrounding medium.

This invention was disclosed and described in my application Serial No. 293,465, filed June 13, 1952, which application has become abandoned. However, reference may be made to this application for the purpose of completing the disclosure set forth below.

The invention utilizes a heretofore unknown electrokinetic phenomenon which I have discovered; namely, that when a pair of electrodes of appropriate form are held in a certain fixed spaced relation to each other and immersed in a dielectric medium and then oppositely charged to an appropriate degree, a force is produced tending to move the pair of electrodes through the medium. The invention is concerned primarily with certain apparatus for utilizing such phenomenon in various manners to be described.

Priorly, intervening electrokinetic apparatus has been employed to convert electrical energy to mechanical energy and then to convert the mechanical energy to the required force. Except for the insignificantly small forces of electrostatic attraction and repulsion, electrical energy has not been used for the direct production of force and motion.

Since any conversion of energy from one form to another is accompanied by losses due to friction, radiation or conduction of heat, hysteresis, and the like, as well as serious reductions in the availability of the energy by increases in the entropy of the system, it is apparent that great increases in efficiency may be achieved through the use of the direct production of electrical energy and force and motion made possible by my invention. Likewise, the elimination of the machinery for the intermediate conversions results in great savings in first costs, maintenance, weight and space, the latter two being of great importance in self-propelled vehicles including mobile vehicles such as aircraft and space craft.

It is therefore an object of my invention to provide an apparatus for converting the energy of an electrical potential directly into a mechanical force suitable for causing relative motion between a structure and the surrounding medium.

It is another object of this invention to provide a novel apparatus for converting an electrical potential directly to usable kinetic energy.

It is another object of this invention to provide a novel apparatus for converting electrostatic energy directly into kinetic energy.

It is another object of this invention to provide a vehicle motivated by electrostatic energy without the use of moving parts.

It is still another object of this invention to provide a self-propelled vehicle without moving parts.

It is a feature of my invention to provide an apparatus for producing relative motion between a structure and the surrounding medium which apparatus includes a pair of electrodes of appropriate form held in fixed spaced relation to each other and immersed in a dielectric medium and oppositely charged.

It is another feature of my invention to provide apparatus which includes a body defining one electrode, another separate electrode supported in fixed spaced relation by said body, and a source of high electrical potential connected between the body and the separate electrode.

It is also a feature of my invention to provide apparatus having a body which is hollow and a source of potential contained within the body.

It is another feature of my invention to provide apparatus having a body and an electrode connected to the body, which combination comprises a vehicle.

It is also a feature of my invention to provide apparatus which comprises a plurality of assemblies, each including a body and an electrode secured in side-by-side spaced relation to each other.

It is another feature of my invention to provide vehicular apparatus which includes a pair of electrically conductive body portions joined by an insulating portion, whereby said electrically conductive portions constitute the electrodes.

Other objects and advantages of my invention will be apparent from a consideration of the following specification, read in connection with the accompanying drawings, wherein:

Figure 6 is a perspective view of one illustrative embodiment of this invention showing a pair of electrokinetic propulsion devices suspended from a rotatable arm which arm is supported at its midpoint;

Figure 7 is a side elevational view of a mobile vehicle with parts broken away to show the interior construction;

Figure 8 is a side elevational view illustrating diagrammatically the arrangement of parts used in an alternative form of mobile vehicle.

Figure 1:
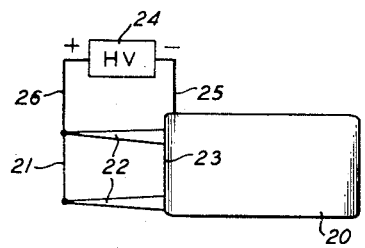
Figure 1 is a side elevational view illustrating diagrammatically a simple form of apparatus embodying and functioning in accordance with the principles of my invention.

Referring to the drawings, I have illustrated in Figure 1 a simple form of apparatus which is readily adaptable for use in demonstrating the principles of my invention, and which is utilized in this application as a simplified representation to facilitate an understanding of the principles involved. The apparatus illustrated in Figure 1 constitutes one electrode which is preferably in the form of a body member 20, said member preferably comprising a relatively thin flat plate. A second electrode 21 in the form of a wire or other suitable form of electrical conductor is held as by means of insulated supports 22 in fixed spaced relation to the body 20, the wire 21 being disposed in the plane of the body 20 and preferably substantially parallel with a leading edge 23 of the body 20. A source 24 of high voltage electrical potential is provided and connected as shown at 25 and 26 to the two electrodes 20 and 21, respectively.

I have discovered that when apparatus of the character just described is immersed in a dielectric medium, as for example, the ordinary air of the atmosphere, there is produced a force tending to move the entire assembly through the medium, and this force is applied in such direction as to tend to move the body 20 toward the leading electrode 21. This force produces relative motion between the apparatus and the surrounding fluid dielectric. Thus, if the apparatus is held in a fixed position, the dielectric medium is caused to move past the apparatus and to this extent the apparatus may be considered as analogous to a pump or fan. Conversely, if the apparatus is free to move, the relative motion between the medium and the apparatus results in a forward motion of the apparatus, and it is thus seen that the apparatus is a self-propulsive device.

Figure 2:
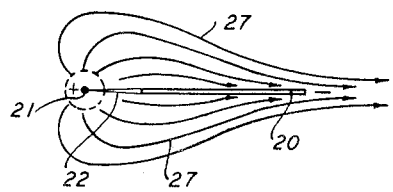
Figure 2 is a plan view of the apparatus shown in Figurue 1.

While the phenomenon just described has been observed and its existence confirmed by repeated experiment, the principles involved are not completely understood. It has been determined that the greatest forces are developed when the leading electrode is made positive with respect to the body 20, and it is accordingly thought that in the immediate vicinity of the electrode 21 where the potential gradient is very high, free electrons are stripped off of the atoms and molecules of the surrounding medium. These electrons migrate to the positive electrode 21 where they are collected. This removal of free electrons leaves the respective atoms and molecules positively charged and such charged atoms and molecules are accordingly repelled from the positive electrode 21 and attracted toward the negative electrode 20. The paths of movement of these positively charged particles appear to be of the nature represented by the lines 27 in Figure 2.

It appears that upon reaching or closely approaching the surface of the body 20, the positively charged atoms and molecules have their positive charges neutralized by the capture of electrons from the body 20 and in many cases, it may be that excess electrons are captured whereby to give such atoms and molecules a negative charge so that they are actually repelled from the body 20.

It will be appreciated that the mass of each of the individual electrons is approximately one two-thousandths the mass of the hydrogen atom and is accordingly negligible as compared with the mass of the atoms and molecules of the medium from which they are taken. The principal forces involved therefore are the forces involved in moving the charged atoms and molecules from the region of the positive electrode 21 to and beyond the negatively charged body 20. The force so exerted by the system on those atoms and molecules not only produces a flow of the medium relative to the apparatus, but, of course, results in a like force on the system tending to move the entire system in the opposite direction; that is, to the left as viewed in Figure 1 of the drawing.

The above suggested explanation of the mode of operation of the device is supported by observation of the fact that the dimensions and potentials utilized must be adjusted to produce the required electric field and the resulting propulsive force. Actually I have found that the potential gradient must be below that value required to produce a visible corona since corona is objectionable inasmuch as it represents losses through the radiation of heat, light and molecular charges in the medium.

My experiments have indicated that the electrode 21 may be of small diameter for the lower voltage ranges, i.e. below 125 kv. while above this voltage, rod or hollow pipe electrodes are preferred. These large electrodes are preferred for the higher voltages since sharp points or edges are eliminated which at these elevated potentials would produce losses thus diminishing the thrust. For example, electrodes to be operated at potentials below 125 kv. may be made from small gauge wire only large enough to provide the required mechanical rigidity while electrodes to be operated at potentials above 125 kv. may be hollow pipes or rods having a diameter of ¼ to ½ inch.

Figure 3:
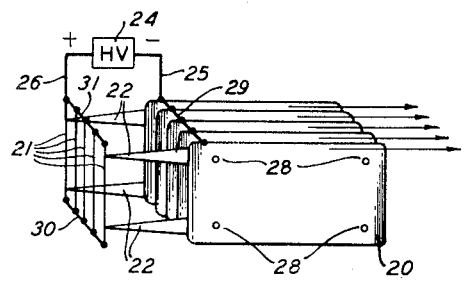
Figure 3 is a perspective view illustrating the manner in which a plurality of devices of the character illustrated in Figure 1 may be interconnected for joint operation.

In Figure 3, I have illustrated the manner in which a plurality of assemblies, such as are shown in Figure 1, may be interconnected for joint operation. As may be seen from Figure 3, a plurality of such assemblies are placed in spaced side-by-side relation. They may be held fixed in such spaced relation through the use of a plurality of tie rods 28 and interposed spacers (not shown) placed between adjacent plates 20. The assembly of plates 20 may be electrically interconnected by a bus bar or similar conductor 29 to which the negative lead 25 is connected. In a similar way, the plurality of positive leading electrodes 21 may be held in appropriately spaced relation to each other by fastening their ends to pairs of bus bars 30 and 31, to the latter of which the positive lead 26 is connected. The assembly of leading electrodes 21 may be held in spaced relation to the assembly of body members 20 by an appropriate arrangement of the supports 22.

Figure 4:
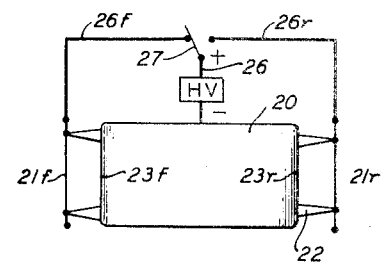
Figure 4 is a diagrammatic view similar to Figure 1 illustrating a modified form of the invention providing a means for reversing the direction of the propulsive force produced.

In Figure 4, I have illustrated diagrammatically an arrangement of parts for producing a reversible action; that is, permitting the direction of the propulsive force to be reversed. The apparatus is similar to that shown in Figure 1, differing therefrom in utilizing a pair of leading electrodes 21f and 21r spaced by means of spacers 22 from the front and rear edges 23f and 23r of the body member 20 in a manner similar to that described with reference to the supports 22 in Figure 1. The source 24 of high voltage electrical potential has its negative terminal connected to the body 20 as by means of the aforementioned conductor 25. The positive terminal is connected as by means of the conductor 26 to the blade 27 of a single-pole, double-throw switch, serving in one position to connect the conductor 26 to a conductor 26f which is in turn connected to the forward electrode 21f and arranged in its opposite position to connect the conductor 26 to a conductor 26r which is in turn connected to the reverse electrode 21r.

It will be seen that with the switch 27 in the position shown in Figure 4, the apparatus will operate in the manner described in connection with Figure 1, causing the assembly to move to the left as viewed in Figure 4. By throwing the switch 27 to the opposite position, the direction of the forces produced are reversed and the device moves to the right as viewed in Figure 4.

Figure 5:
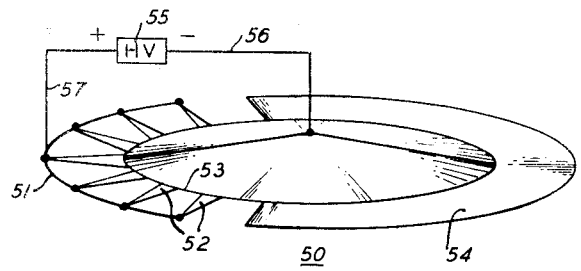
Figure 5 is a perspective view illustrating diagrammatically a self-propelled device utilizing the principles of this invention.

In Figure 5, I have illustrated the principles of the invention as embodied in a simple form of mobile vehicle. This device includes a body member 50 which is preferably of the form of a circular disc somewhat thicker in its center than at its edges. The disc 50 constitutes one of the electrodes and is the equivalent of the body member 20 referred to in connection with Figure 1. A leading electrode 51 in the form of a wire or similar small diameter conductor is supported from the body 50 by a plurality of insulating supports 52 in uniform spaced parallel relation to a leading edge portion 53 of the body 50. A skirt or similar fairing 54 may be carried by the body 50 to round out the entire structure so as to provide a device which is substantially circular in plan. A source of high voltage electrical potential 55 is provided with its negative terminal connected as indicated at 56 to the body 50 and its positive terminal connected as indicated at 57 to the leading electrode 51.

The device operates in the same manner as the apparatus shown in Figure 1 to produce a force tending to move the entire assembly through the surrounding medium to the left as viewed in Figure 5 of the drawing.

Referring now to Figure 6, there is depicted an illustrative embodiment of this invention in which a pair of mobile vehicles, such as depicted in Figure 5, are shown suspended from the terminals of arm 40, which arm is supported at its midpoint by a vertical column 41. High voltage source 55 is shown connected through wires 56 and 57 which extend to the ends of arm 40 by way of suitable rotatable contacts 44 and 45 and brushes 46 and 47 adjacent point 43 in the center of arm 40. Mobile vehicle 50 is shown suspended from one end of the lever arm 40 by means of conductors 56 and 57. A similar vehicle 58 is shown suspended from the other end of the rotatable arm by conductors 56 and 57. It is, of course, understood that these bodies may be suspended by any convenient structure such as wires or rods which wires or rods may support conductors 56 and 57 in any suitable manner.

In this illustrative embodiment the vehicles were caused to rotate at a speed of 17 feet per second with 50 kv. applied to conductors 56 and 57 from source 55. It is, of course, understood that these figures are merely by way of illustrative example and, as might be expected, the speed of the vehicles increases exponentially with the applied voltage.

When the apparatus is to be used for propelling a mobile vehicle, it is, of course, necessary that the source 55 of high voltage be contained within and carried by the vehicle. This may be accomplished by using the apparatus in the manner shown in Figure 7, wherein the high voltage source 55 is contained within the hollow central portion of the body 50, the conductor 56 being connected to the body and the conductor 57 being suitably insulated from the body 50 and extended externally thereof and into connection with the leading conductor 51.

The apparatus of my invention may be used to propel vehicles of shapes other than that described in connection with Figures 5 and 7. For example, in Figure 8 I have illustrated the way in which the invention may be utilized in the propulsion of a vehicle of torpedo-like shape. As is shown in Figure 8, I use a body member which is indicated generally by the reference character 60 and which is formed of three parts, to wit, an afterbody 61 formed of electrically conductive material, a hollow central body portion 62 formed of insulating material, and a nose portion 63 formed of electrically conductive material. A source 64 of high voltage electrical potential is contained within the hollow central body portion 62 and has its terminals connected, respectively, to the nose portion 63 and afterbody portion 61, the positive terminal being preferably the one which is connected to the nose portion 63. Thus, the afterbody 61 functions as the aft electrode 20 described with reference to Figure 1 and the nose portion 63 corresponds to the leading electrode 21.

The nose portion 63 may be equipped with a plurality of suitably shaped fins 65. These fins may be extended aft of the junction between the central body 62 and the nose portion 63, as shown at 66, to provide ionizing elements which are spaced more closely to the afterbody 61 and which functions in a manner analogous to the smaller diameter electrode 21. Also, the fins may be shaped to conform to the aerodynamic requirements and may, if desired, be movable in whole or in part for the purpose of permitting the machine to be maneuvered.

I have shown the nose portion 63 as being provided with a needle-like point 67. By using such a nose form, which at present appears to be the best suited for flying speeds approaching or exceeding the speed of sound, I am able to produce an ionization of the atmosphere in the immediate region of this foremost portion of the mobile vehicle. I believe that this ionization facilitates piercing the sonic barrier and minimizes the abruptness with which the transition takes place in passing from subsonic velocities to supersonic velocities.

From the foregoing it will be observed that I have provided an electrokinetic method and apparatus for the production of forces suitable for causing relative motion between a structure and the surrounding medium. It will be observed that the methods and apparatus described herein are particularly adaptable for use as a propulsive means for self-propelled vehicles. I wish to emphasize that the high voltage power source referred to herein may be of relatively simple construction and relatively low capacity. For example, potentials of the order of 30 to 70 thousand volts may be adequate for use with this apparatus, the particular voltage employed dependent, of course, upon the size of the vehicle or apparatus. It will be appreciated that the elimination of moving parts in the apparatus will represent a tremendous saving in first cost and maintenance cost of the apparatus also the direct production of the motive forces from the electrical force represents a high efficiency so that greater propulsive forces and speeds may be obtained with apparatus occupying small space and of light weight.

While I have shown and described various embodiments of my invention, it is appreciated that the principles thereof may be extended to many and varied types of machines and apparatus. The invention therefore is not to be limited to the details illustrated and described herein.

Certain of the physical principles embodied herein are disclosed and described in my application Serial No. 669,727, filed July 3, 1957, which is directed to the generation of high voltages by means of electrokinetic apparatus.

In my application Serial No. 669,831, filed July 3, 1957, electrokinetic principles are employed in conjunction with apparatus somewhat similar to that disclosed and described in the instant application to produce a novel transducer.

I claim:

1. Thrust producing apparatus comprising an electroconductive body having a relatively large, substantially smooth area thereof exposed to the surrounding medium, an electrode supported on said body, insulated therefrom and shaped to produce a concentrated electrostatic field when electrically charged with respect to said body, and power means connected between said body and electrode to impress high voltage thereon whereby to cause relative movement of an ionizable dielectric medium surrounding said electrodes.

2. Thrust producing apparatus comprising an electrode having a substantially flat exposed surface, an elongated electrode extending along one edge of said surface and equidistant therefrom and supported in fixed spaced relationship with respect to said edge of said surface and substantially in the plane thereof, and power means connected across said electrodes to impress high voltage thereon whereby to cause relative movement of an ionizable dielectric medium surrounding said electrodes.

3. Thrust producing apparatus comprising a substantially flat hollow electrode, an electrode supported in fixed spaced relationship with respect to an edge of said flat electrode and substantially in the plane thereof, and power means within said hollow electrode connected across said electrodes to impress high voltage thereon thereby causing relative movement of an ionizable dielectric medium surrounding said electrodes.

4. Thrust producing apparatus comprising a substantially flat electrode having a pair of electrodes supported in fixed spaced relationship with opposite edges of said flat electrode and substantially in the plane thereof, a high voltage source with one terminal connected to said flat electrode and switching means connected to the other terminal of said source, and adapted to connect said other terminal selectively to one or the other of said electrodes whereby to cause relative movement of an ionizable medium surrounding said electrodes selectively in one direction or the other depending on which of said electrodes is connected to said source.

5. Thrust producing apparatus comprising a group of flat electrodes each having a continuous edge, said flat electrodes being supported in spaced parallel relation and electrically interconnected, a group of elongated electrodes, each supported in fixed spaced relationship with respect to one of said edges, said electrodes being electrically interconnected and a high voltage source connected across said groups of electrodes whereby to cause relative movement of an ionizable dielectric medium surrounding said electrodes.

6. Thrust producing apparatus comprising a disc-shaped electrode, an electrode arranged in an arc of less than 180° spaced from an edge of said disc electrode and substantially in the plane thereof and power means connected across said electrodes to impress a high voltage potential thereon whereby to cause relative movement of an ionizable dielectric medium surrounding said electrodes.

7. Apparatus for producing relative motion between a vehicle body and the surrounding medium comprising a vehicle body having a conducting nose portion, a central portion and a conducting afterbody having a relatively large surface area and a source of high voltage connected between said conducting nose portion and said conducting afterbody whereby the application of said voltage to said conducting nose portion and said conducting afterbody cause relative motion between said body and the surrounding medium.

8. Apparatus for producing relative motion between a body and the surrounding medium comprising a body portion, an elongated electrode mounted on and insulated from said body portion and a source of potential having its positive terminal connected to said electrode and its negative terminal connected to said body portion whereby said electrical potential is converted directly into a motive force.

9. Apparatus for producing relative motion between a body and the surrounding medium in accordance with claim 8 wherein said body portion includes an electrical conducting surface and wherein said electrode is mounted in fixed spacial relation to said body.

10. Apparatus for producing relative motion between a body and the surrounding medium in accordance with claim 8 further comprising a rotatable arm, said body being connected to said rotatable arm.

11. Apparatus for producing relative motion between a first and a second body and the surrounding medium comprising a first conductive body portion, a second conductive body portion, each of said body portions having a relatively large surface area and having an elongated electrode mounted thereon in fixed spacial relationship, a source of potential connected to each of said bodies and each of said electrodes and means for supporting said bodies in rotatable relationship.

12. Apparatus for producing relative motion in accordance with claim 11 wherein said supporting means comprises an arm, and a support for said arm, said first and said second bodies being connected to the ends of said arm.

References Cited in the file of this patent

UNITED STATES PATENTS 1,974,483    Brown _____ Sept. 25, 1934